(12) United States Patent
Zhao et al.

(10) Patent No.: US 12,373,357 B2
(45) Date of Patent: Jul. 29, 2025

(54) SYSTEMS AND METHODS FOR DATA COMMUNICATION BUS ADDRESS SHARING

(71) Applicant: Advanced Micro Devices, Inc., Santa Clara, CA (US)

(72) Inventors: Kaifei Zhao, Shanghai (CN); Lili Chen, Shanghai (CN); Jundong Yang, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 128 days.

(21) Appl. No.: 18/475,713

(22) Filed: Sep. 27, 2023

(65) Prior Publication Data

US 2025/0103517 A1   Mar. 27, 2025

(51) Int. Cl.
   *G06F 13/36*   (2006.01)
   *G06F 13/10*   (2006.01)

(52) U.S. Cl.
   CPC ............ *G06F 13/102* (2013.01); *G06F 13/36* (2013.01)

(58) Field of Classification Search
   CPC ................................ G06F 13/102; G06F 13/36
   USPC ............................................................. 710/9
   See application file for complete search history.

(56) References Cited

U.S. PATENT DOCUMENTS

| | | | | |
|---|---|---|---|---|
| 5,818,350 A * | 10/1998 | Estakhri | ................... | G11C 8/12 340/9.16 |
| 7,308,516 B2 * | 12/2007 | Dressen | .................. | H04L 25/45 710/110 |
| 7,761,633 B2 * | 7/2010 | Devila | ................ | G06F 13/4291 710/110 |
| 8,433,838 B2 * | 4/2013 | Crockett | ............ | G06F 13/4291 710/110 |
| 10,055,376 B1 * | 8/2018 | Newkirk | ............. | G06F 13/4068 |
| 10,253,717 B1 * | 4/2019 | Esposito | ................. | F02D 41/26 |
| 12,038,780 B1 * | 7/2024 | Contini | ................. | G04F 10/005 |
| 2003/0117191 A1 * | 6/2003 | Kwak | .................. | H03L 7/0814 327/158 |
| 2005/0077976 A1 * | 4/2005 | Cohen | ................. | H04L 25/4902 332/112 |
| 2005/0239503 A1 * | 10/2005 | Dressen | .................. | H04L 25/45 455/557 |
| 2011/0078350 A1 * | 3/2011 | Carls | ........................ | G06F 1/04 713/502 |
| 2012/0072628 A1 * | 3/2012 | Crockett | ............ | G06F 13/4291 710/110 |

(Continued)

*Primary Examiner* — Christopher B Shin
(74) *Attorney, Agent, or Firm* — Greenberg Traurig, LLP (57) ABSTRACT

A computer-implemented method for data communication bus address sharing can include selecting, by at least one processor, one of two or more peripheral devices sharing an address of a data communication bus. The method can additionally include modulating, by the at least one processor, a duty cycle of a clock signal transmitted over the data communication bus to the two or more peripheral devices, wherein the modulating causes a low period of the clock signal to satisfy a threshold condition for indicating selection of the selected one of the two or more peripheral devices. The method can also include performing, by the at least one processor using the address, data communication over the data communication bus with the selected one of the two or more peripheral devices. Various other methods, systems, and computer-readable media are also disclosed.

20 Claims, 9 Drawing Sheets

(56) References Cited

U.S. PATENT DOCUMENTS

| | | | | |
|---|---|---|---|---|
| 2014/0052881 | A1* | 2/2014 | Alley | G06F 13/4247 |
| | | | | 710/110 |
| 2015/0286608 | A1* | 10/2015 | Sengoku | G06F 13/4291 |
| | | | | 710/313 |
| 2020/0142855 | A1* | 5/2020 | Biniguer | G06F 13/4295 |
| 2021/0303503 | A1* | 9/2021 | Remple | G06F 9/30101 |
| 2023/0113151 | A1* | 4/2023 | Meyer | H03K 7/08 |
| | | | | 331/158 |
| 2024/0281401 | A1* | 8/2024 | Mishra | G06F 13/4291 |
| 2024/0364321 | A1* | 10/2024 | Chen | H03K 7/08 |

\* cited by examiner

SYSTEMS AND METHODS FOR DATA COMMUNICATION BUS ADDRESS SHARING

BACKGROUND

Data communication buses that use addresses to perform data communication with peripheral devices can be limited in the number of peripheral devices due to need for each peripheral device to have its own bus address during establishment of data communication. Existing mechanisms cannot allow connection of two or more peripheral devices to the bus using the same address without buffers. Some mechanisms can avoid address conflict by employing a chip buffer or a discrete part to separate peripheral devices on the same bus address, and thus do not achieve direct connection with two or more peripheral devices using the same address. Instead, the bus controller can enable a buffer and pull peripheral devices out of the data communication path when they are not in use, so that the peripheral device in use on that bus address is not sharing it with any other peripheral devices when establishing data communication. This type of mechanism increases latency and costs of the data communication bus.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for data communication bus address sharing. The disclosed systems and methods can allow multiple peripheral devices to share a same address (e.g., a chip select (CS) pin, a unique identifier transmitted over a serial data (SDA) line, etc.) of an addressable bus protocol without requiring use of a buffer or an additional bus. For example, a peripheral (i.e., slave) device can be configured with a timer (e.g., a literal timer, a discharge circuit (e.g., capacitor, resistor, resistor capacitor (RC) circuit) or other mechanism (e.g., delta-sigma circuit)) on the slave clock wire. In some implementations, the peripheral device can use the timer to measure a duration between a chip select signal and an end of a low period of a clock signal. Alternatively, the peripheral device can use the timer to measure the low period of the clock signal.

As used herein, the term "duty cycle" can generally refer to a ratio of an amount of time a load circuit is on compared to an amount of time the load or circuit is off. For example, a duty cycle can be expressed as a percentage of on time. In this context, a sixty-percent duty cycle can correspond to a signal that is on sixty-percent of the time and off forty-percent of the time. A duty cycle of a clock signal of a data communication bus can be required to have a minimum on time and a minimum off time within a given clock signal duty ratio time period. For example, and as detailed later herein with reference to FIG. 5, I2C communication bus protocol parameters for 100K standard mode specify a clock signal duty ratio period of ten microseconds, a low minimal duty cycle of 4.7 microseconds, and a high minimal duty cycle of 4.0 microsecond, totaling 8.7 microseconds of the ten microseconds available. As a result, the clock signal can be modulated up to 1.3 microseconds while remaining in the requirements of the example protocol. Various data bus communication protocols have different requirements relating to clock signal duty cycle and period. Thus, the range of 1.3 microseconds is purely for illustration.

The term "clock period parameters," as used herein, can generally refer to one or more requirements relating to clock period as specified by a data communication bus protocol. For example, and without limitation, clock period parameters can include a clock signal duty ratio period, a minimum low period of the clock signal duty ratio period, and a minimum high period of the clock signal duty ratio period. For example, and as detailed later herein with reference to FIG. 5, I2C communication bus protocol parameters for 100K standard mode specify a clock signal duty ratio period of ten microseconds, a minimum low period of 4.7 microseconds, and a and a minimum high period of 4.0 microsecond. Various data bus communication protocols can have different clock period parameters.

A communication bus controller of the disclosed systems and methods can allow multiple peripheral devices to share a same address of an addressable bus protocol without requiring use of a buffer or an additional bus by modulating the clock signal of the data communications bus to indicate which peripheral device sharing the address should perform data communication over the data communication bus with the data communication bus controller. For example, the data communication bus controller (i.e., master) firmware can be configured to adjust the clock duty cycle to control a duration between a chip select signal and an end of a low period of a clock signal depending on the particular device (e.g., sharing a same CS pin, sharing a same SDA line, etc.) with which it wishes to communicate. Thus, both the master and peripheral device can observe one or more threshold conditions. For example, one peripheral device sharing a CS pin can respond to the CS pin being pulled low if the duration is below a threshold, and another peripheral device sharing the same CS pin can respond to the CS pin being pulled low if the duration is above the threshold. In another example, one peripheral device sharing an SDA line can respond to the receipt of a start signal if the duration is below a threshold, and another peripheral device sharing the SDA signal line can respond to receipt of the start signal if the duration is above the threshold. Multiple thresholds can be used to allow more than two peripheral devices to share a same address (e.g., CS line, SDA line, etc.). Advantageously, the device address space can be increased at significantly lower cost compared to use of a buffer or an additional bus.

Figure 1:
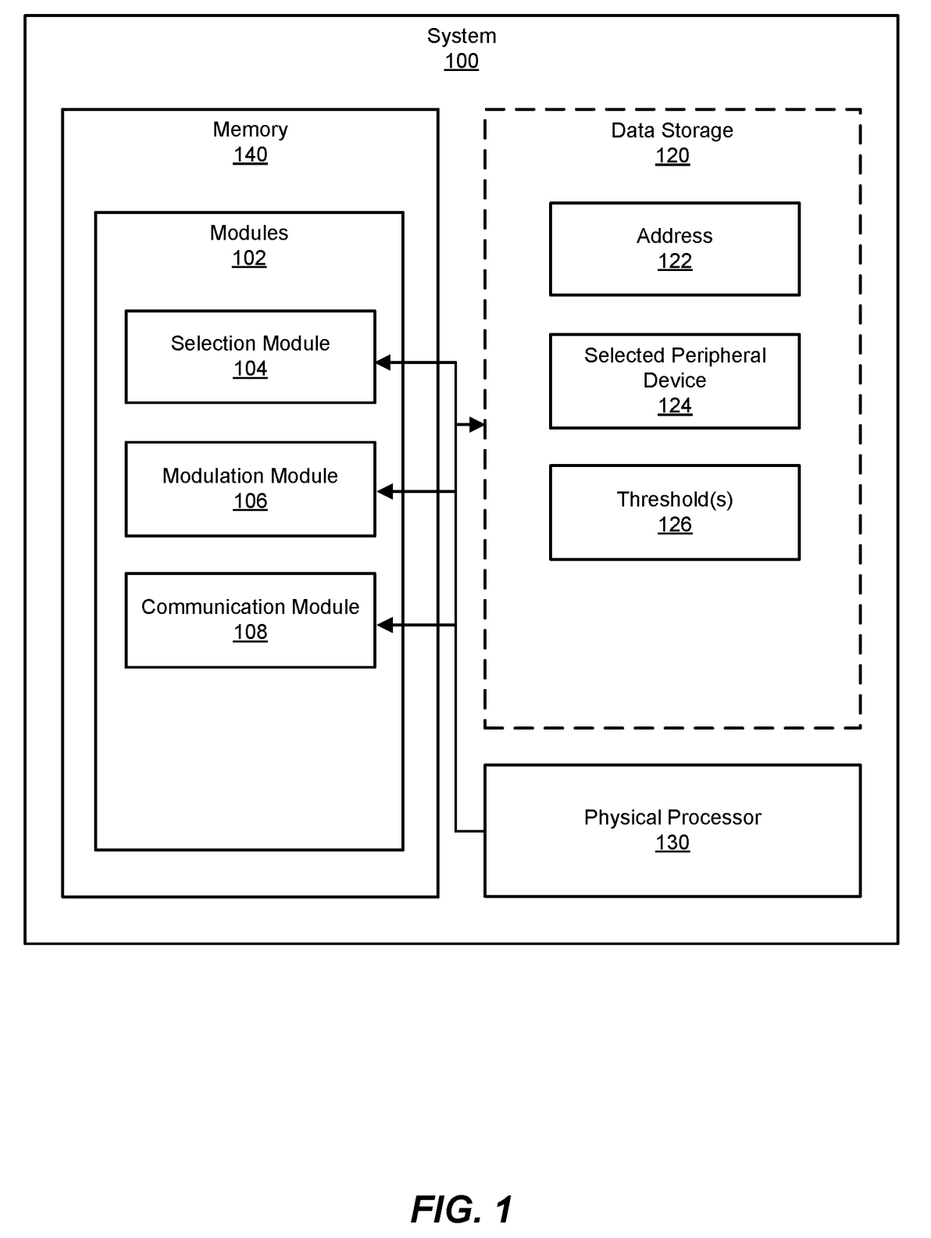
FIG. 1 is a block diagram of an example system for data communication bus address sharing.
Figure 3:
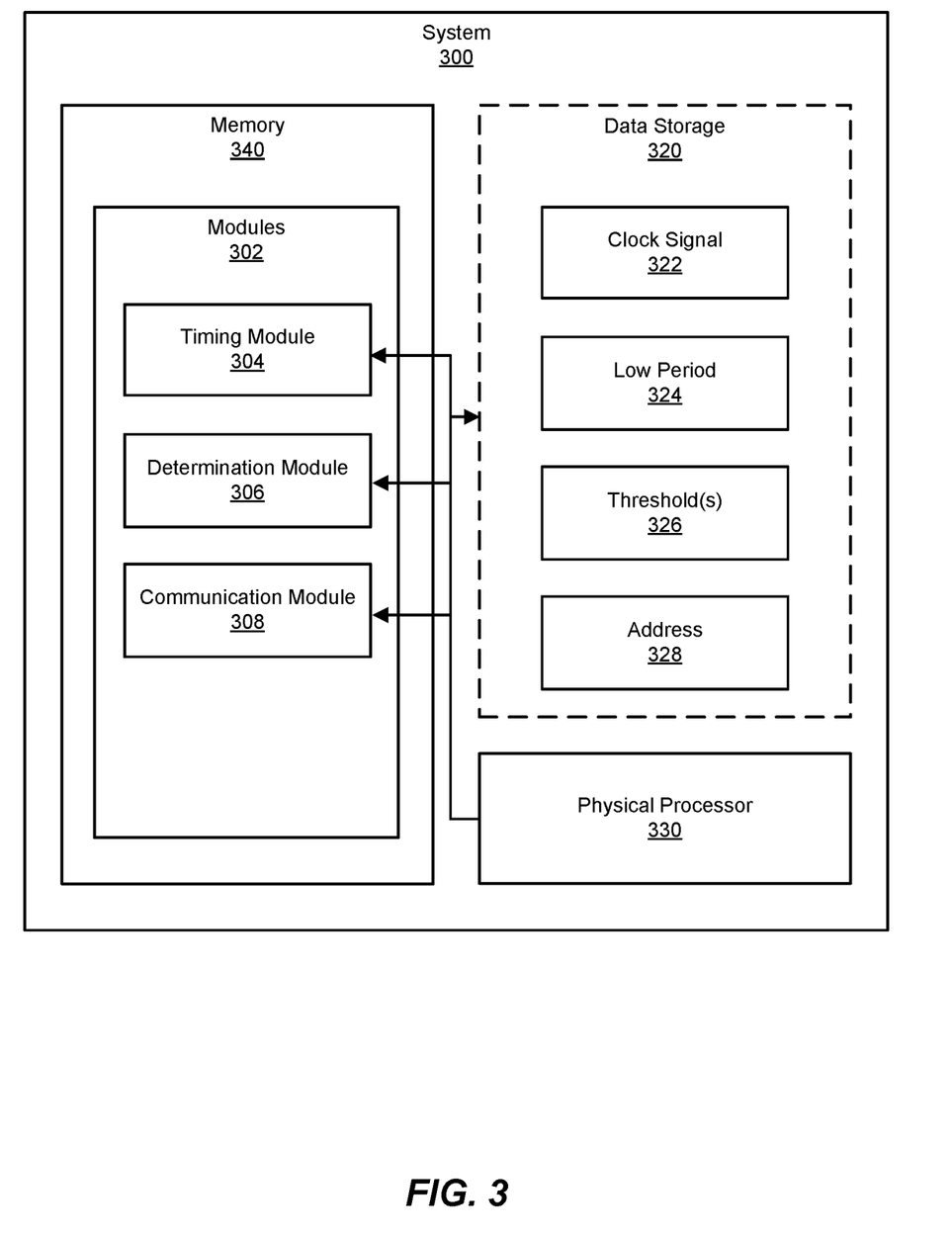
FIG. 3 is a block diagram of another example system for data communication bus address sharing.

The following will provide, with reference to FIGS. 1 and 3, detailed descriptions of example systems for data communication bus address sharing. Detailed descriptions of corresponding computer-implemented methods will also be provided in connection with FIGS. 3 and 4. In addition, detailed descriptions of example data communication bus protocol parameters will be provided in connection with FIG. 5. Further, detailed descriptions of example methods for data communication bus address sharing will be provided in connection with FIG. 6. Further, detailed descriptions of example an example data communication bus will be provided in connection with FIG. 7. Further, detailed descriptions of an example timing diagram depicting specifications and timing relationships according to another example data communication bus protocol will be provided in connection with FIG. 8. Further, detailed descriptions of an example peripheral device having data communication bus address sharing capability will be provided in connection with FIG. 9.

In one example, a data communication bus controller includes selection circuitry configured to select one of two or more peripheral devices sharing an address of a data communication bus, modulation circuitry configured to perform modulation of a duty cycle of a clock signal transmitted over the data communication bus to the two or more peripheral devices, wherein the modulation causes a low period of the clock signal to satisfy a threshold condition for indicating selection of the selected one of the two or more peripheral devices, and communication circuitry configured to use the address to perform data communication over the data communication bus with the selected one of the two or more peripheral devices.

Another example can be the previously described example data communication bus, wherein the communication circuitry is further configured to transmit, to the two or more peripheral devices, a start signal.

Another example can be any of the previously described example data communication buses, wherein the communication circuitry is further configured to pull low a chip select signal shared by the two or more peripheral devices.

Another example can be any of the previously described example data communication buses, wherein the modulation causes the low period of the clock signal to fail to satisfy an additional threshold condition for indicating selection of an unselected one of the two or more peripheral devices.

Another example can be any of the previously described example data communication buses, wherein the modulation causes the clock signal to remain within clock period parameters specified by a data communication protocol of the data communication bus.

In one example, a system includes a data communication bus, two or more peripheral devices connected to the data communication bus and configured to share an address of the data communication bus, and a data communication bus controller connected to the data communication bus and configured to modulate a duty cycle of a clock signal transmitted over the data communication bus to the two or more peripheral devices, wherein the modulation causes a low period of the clock signal to satisfy a threshold condition for indicating selection of a selected one of the two or more peripheral devices.

Another example can be any of the previously described example systems, wherein the data communication bus controller is further configured to select the selected one of the two or more peripheral devices.

Another example can be any of the previously described example systems, wherein the data communication bus controller is further configured to use the address to perform data communication over the data communication bus with the selected one of the two or more peripheral devices.

Another example can be any of the previously described example systems, wherein the selected one of the two or more peripheral devices is configured to perform data communication over the data communications bus with the data communication bus controller in response to the satisfaction of the threshold condition.

Another example can be any of the previously described example systems, wherein the data communication bus controller is further configured to at least one of transmit a start signal to the two or more peripheral devices or pull low a chip select signal line shared by the two or more peripheral devices.

Another example can be any of the previously described example systems, wherein the selected one of the two or more peripheral devices is configured to perform data communication over the data communication bus with the data communication bus controller in response to the satisfaction of the threshold condition and the at least one of the start signal or the pulling low of the chip select signal line.

Another example can be any of the previously described example systems, wherein the modulation causes the low period of the clock signal to fail to satisfy an additional threshold condition for indicating selection of an unselected one of the two or more peripheral devices.

Another example can be any of the previously described example systems, wherein the unselected one of the two or more peripheral devices is configured to avoid performing the data communication with the data communication bus controller in response to the failure to satisfy the additional threshold condition.

Another example can be any of the previously described example systems, wherein the modulation causes the clock signal to remain within clock period parameters specified by a data communication protocol of the data communication bus.

Another example can be any of the previously described example systems, wherein the two or more peripheral devices are configured to share the address of the data communication bus without requiring use of a buffer and without requiring use of an additional bus.

In one example, a computer-implemented method includes selecting, by at least one processor, one of two or more peripheral devices sharing an address of a data communication bus, modulating, by the at least one processor, a duty cycle of a clock signal transmitted over the data communication bus to the two or more peripheral devices, wherein the modulating causes a low period of the clock signal to satisfy a threshold condition for indicating selection of the selected one of the two or more peripheral devices, and performing, by the at least one processor using the address, data communication over the data communication bus with the selected one of the two or more peripheral devices.

Another example can be the previously described example method, wherein the selected one of the two or more peripheral devices is configured to perform the data communication over the data communication bus with the at least one processor in response to the satisfaction of the threshold condition.

Another example can be any of the previously described example methods, further including at least one of transmitting, by the at least one processor and to the two or more peripheral devices, a start signal, or pulling low a chip select signal line shared by the two or more peripheral devices.

Another example can be any of the previously described example methods, wherein the selected one of the two or more peripheral devices is configured to perform the data communication over the data communication bus with the at least one processor in response to the start signal and the satisfaction of the threshold condition.

Another example can be any of the previously described example methods, wherein the modulating causes the low period of the clock signal to fail to satisfy an additional threshold condition for indicating selection of an unselected one of the two or more peripheral devices.

Another example can be any of the previously described example methods, wherein the unselected one of the two or more peripheral devices is configured to avoid performing the data communication with the at least one processor in response to the failure to satisfy the additional threshold condition.

FIG. 1 is a block diagram of an example system 100 for data communication bus address sharing. System 100 can generally represent any type of computing device, such as a data communication bus controller.

The term "data communication bus controller," as used herein, can generally refer to a hardware device and/or software program that manages or directs flow of data between two entities over a data communication bus. For example, and without limitation, a data communication bus controller can be implemented as a software program and/or circuitry in a processing unit (e.g., central processing unit (CPU), graphics processing unit (GPU, accelerator processing unit (APU), etc.) that manages or directs flow of data between the processing unit and peripheral devices and/or between two or more peripheral devices over a data communication bus. Alternatively, a data communication bus controller can be implemented as a device (e.g., a dedicated hardware device and/or another processing unit) separate from the aforementioned processing unit, thus shifting the communication bus protocol burden from the aforementioned processing unit.

The term "modules," as used herein, can generally refer to one or more functional components of a computing device. For example, and without limitation, a module or modules can correspond to hardware, software, or combinations thereof. In turn, hardware can correspond to analog circuitry, digital circuitry, communication media, or combinations thereof. In some implementations, the modules can be implemented as microcode (e.g., digital and/or analog circuitry) and/or one or more firmware in a graphics processing unit.

As illustrated in this figure, example system 100 can include one or more modules 102 for performing one or more tasks. As will be explained in greater detail below, modules 102 can include a selection module 104, a modulation module 106, and a communication module 108. Although illustrated as separate elements, one or more of modules 102 in FIG. 1 can represent portions of a single module or application. Examples of modules can include, without limitation, microprocessors, microcontrollers, Central Processing Units (CPUs), graphics processing units (GPUs), accelerator processing units (APUs), Field-Programmable Gate Arrays (FPGAs) that implement softcore processors, Application-Specific Integrated Circuits (ASICs), co-processors, portions of one or more of the same, variations or combinations of one or more of the same, or any other suitable hardware circuits or combinations of hardware circuits and software.

In certain implementations, one or more of modules 102 in FIG. 1 can represent one or more software applications or programs that, when executed by a computing device, can cause the computing device to perform one or more tasks. For example, and as will be described in greater detail below, one or more of modules 102 can represent modules stored and configured to run on one or more computing devices, such as a data communication bus controller. One or more of modules 102 in FIG. 1 can also represent all or portions of one or more special-purpose computers configured to perform one or more tasks.

As illustrated in FIG. 1, example system 100 can also include one or more memory devices, such as memory 140. Memory 140 generally represents any type or form of volatile or non-volatile storage device or medium capable of storing data and/or computer-readable instructions. In one example, memory 140 can store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 can also include one or more physical processors, such as physical processor 130. Physical processor 130 generally represents any type or form of hardware-implemented processing unit capable of interpreting and/or executing computer-readable instructions. In one example, physical processor 130 can access and/or modify one or more of modules 102 stored in memory 140. Additionally or alternatively, physical processor 130 can execute one or more of modules 102 to facilitate data communication bus address sharing. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 can also include one or more instances of stored data, such as data storage 120. Data storage 120 generally represents any type or form of stored data, however stored (e.g., signal line transmissions, bit registers, flip flops, software in rewritable memory, configurable hardware states, combinations thereof, etc.). In one example, data storage 120 includes databases, spreadsheets, tables, lists, matrices, trees, or any other type of data structure. Examples of data storage 120 include, without limitation, address 122, selected peripheral device 124, and threshold(s) 126.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 2:
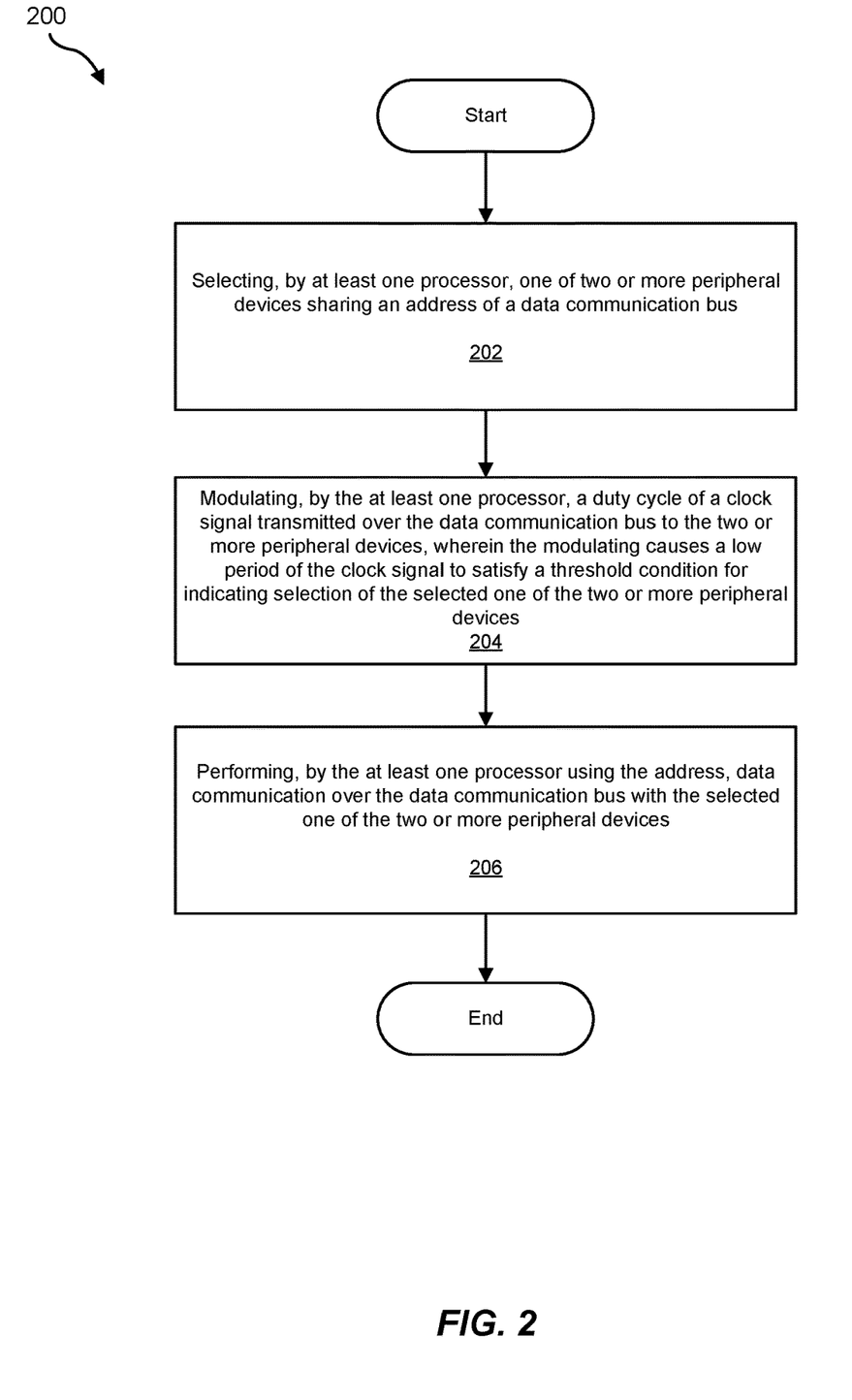
FIG. 2 is a block diagram of an additional example system for data communication bus address sharing.

FIG. 2 is a flow diagram of an example computer-implemented method 200 for data communication bus address sharing. As illustrated in FIG. 2, at step 202 one or more of the systems described herein can select a peripheral device. For example, selection module 104 can select, by at least one processor, one of two or more peripheral devices sharing an address of a data communication bus.

The term "data communication bus," as used herein, can generally refer to a communication system that transfers data between components inside a computer and/or between computers. For example, and without limitation, a data communication bus can be a data bus, an address bus, and/or a control bus. Example types of data communication busses can be PC/AT, PCI, PCMCIA, VME, VXI, S-100, MC6800, STD, Multibus I and II, CompactPCI, Microchannel, IDE, SCSI, GPIB (IEEE 488), Centronics parallel, USB, FireWire (IEEE 1394), Bluetooth, 20 mA current loop, RS-232C, RS-422A/RS-485, Ethernet (IEEE 802.3), Token ring, FDDI, Modbus/Modbus Plus, Profibus, and Foundation Fieldbus. Example data communication bus protocols can include I2C, SPI, and UART.

The term "peripheral devices," as used herein, can generally refer to any devices that connect to a data communication bus controller via a data communication bus. For example, and without limitation, a peripheral device can be a slave device in a master-slave device configuration of devices in which the data communication bus controller acts as the master device.

The term "address," as used herein, can generally refer to a unique identifier and/or component of a computer processor for controlling communication on a communication medium. For example, and without limitation, an address can trigger communication with and/or route communication to and/or from an individual peripheral device and/or a particular subset of peripheral devices connected to a data communication bus. Example types of addresses can include a chip select (CS) pin, a unique identifier transmitted over a serial data (SDA) line, etc.

The systems described herein can perform step 202 in a variety of ways. In one example, selection module 104 can detect presence of data in a data transmission buffer, wherein the data is designated for transmission to the peripheral device. In response to the detection, selection module can select the peripheral device as a device, on a shared bus address, designated to receive the data using the shared bus address. The selection can be from among the two or more peripheral devices sharing the same bus address. The selection can refer to one or more thresholds to determine a degree of clock signal modulation to employ in order to cause a low period of the clock signal to satisfy a threshold condition for indicating, to each of the two or more peripheral devices sharing the same bus address, selection of the selected one of the two or more peripheral devices.

At step 204 one or more of the systems described herein can modulate a duty cycle. For example, modulation module 106 can modulate, by the at least one processor, a duty cycle of a clock signal transmitted over the data communication bus to the two or more peripheral devices, wherein the modulating causes a low period of the clock signal to satisfy a threshold condition for indicating selection of the selected one of the two or more peripheral devices.

The term "modulate," as used herein, can generally refer to altering a characteristic of a waveform. For example, and without limitation, modulation can include adjusting timing characteristics of a clock signal, such as duty cycle and/or duty cycle ratio.

The term "low period," as used herein, can generally refer to a period of time during which a digital clock signal is pulled low. For example, and without limitation, the low period of the clock signal can correspond to approximately fifty percent of a clock signal duty cycle in which the clock signal is a square wave. In this context, modulation of the duty cycle of the clock signal can change this duty cycle ratio.

The term "pull low," as used herein, can generally refer to emitting a low signal. For example, and without limitation, an I2C bus can, instead of including two stacked transistors inside a chip that are connected to emit a high signal (e.g., push) and emit a low signal (e.g., pull), utilize a single transistor connected to an open drain output, the source of which is connected to ground. Thus, turning on the transistor pulls the signal line to ground, emitting a low signal. This implementation can avoid the possibility of multiple chips connected to a same signal line emitting high signals simultaneously, thus avoiding the potential to burn out one or more of the chips.

The term "threshold condition," as used herein, can generally refer to an amount, level, or limit on a scale that is implemented as a requirement for triggering an event or operation. For example, and without limitation, a threshold condition can be an amount of time, a clock duty cycle ratio, and/or a range thereof.

The systems described herein can perform step 204 in a variety of ways. In one example, the modulating can cause the low period of the clock signal to fail to satisfy an additional threshold condition for indicating selection of an unselected one of the two or more peripheral devices. In this context, the unselected one of the two or more peripheral devices can be configured to avoid performing the data communication with the at least one processor in response to the failure to satisfy the additional threshold condition. Further, the modulation can cause the clock signal to remain within clock period parameters specified by a data communication protocol of the data communication bus.

At step 206 one or more of the systems described herein can perform data communication. For example, communication module 108 can perform, by the at least one processor using the address, data communication over the data communication bus with the selected one of the two or more peripheral devices.

The systems described herein can perform step 206 in a variety of ways. In one example, the selected one of the two or more peripheral devices can be configured to perform the data communication over the data communication bus with the at least one processor in response to the satisfaction of the threshold condition. Additionally, communication module 108 can transmit, by the at least one processor and to the two or more peripheral devices, a start signal. Alternatively, communication module 108 can pull low a chip select signal line shared by the two or more peripheral devices. In these contexts, the selected one of the two or more peripheral devices can be configured to perform the data communication over the data communication bus with the at least one processor in response to the satisfaction of the threshold condition and the start signal and/or the pulling low of the chip select signal line.

FIG. 3 is a block diagram of an example system 300 for data communication bus address sharing. System 300 can generally represent any type of computing device, such as a peripheral device connectable to a data communication bus.

As illustrated in this figure, example system 300 can include one or more modules 302 for performing one or more tasks. As will be explained in greater detail below, modules 302 can include a timing module 304, a determination module 306, and a communication module 308. Although illustrated as separate elements, one or more of modules 302 in FIG. 3 can represent portions of a single module or application.

In certain implementations, one or more of modules 302 in FIG. 3 can represent one or more software applications or programs that, when executed by a computing device, can cause the computing device to perform one or more tasks. For example, and as will be described in greater detail below, one or more of modules 302 can represent modules stored and configured to run on one or more computing devices, such as a peripheral device connectable to a data communication bus. One or more of modules 302 in FIG. 3 can also represent all or portions of one or more special-purpose computers configured to perform one or more tasks. Examples of modules can include, without limitation, microprocessors, microcontrollers, Central Processing Units (CPUs), graphics processing units (GPUs), accelerator processing units (APUs), Field-Programmable Gate Arrays (FPGAs) that implement softcore processors, Application-Specific Integrated Circuits (ASICs), co-processors, portions of one or more of the same, variations or combinations of one or more of the same, or any other suitable hardware circuits or combinations of hardware circuits and software.

As illustrated in FIG. 3, example system 300 can also include one or more memory devices, such as memory 340. Memory 340 generally represents any type or form of volatile or non-volatile storage device or medium capable of storing data and/or computer-readable instructions. In one example, memory 340 can store, load, and/or maintain one or more of modules 302. Examples of memory 340 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 3, example system 300 can also include one or more physical processors, such as physical processor 330. Physical processor 330 generally represents any type or form of hardware-implemented processing unit capable of interpreting and/or executing computer-readable instructions. In one example, physical processor 330 can access and/or modify one or more of modules 302 stored in memory 340. Additionally or alternatively, physical processor 330 can execute one or more of modules 302 to facilitate data communication bus address sharing. Examples of physical processor 330 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 3, example system 300 can also include one or more instances of stored data, such as data storage 320. Data storage 320 generally represents any type or form of stored data, however stored (e.g., signal line transmissions, bit registers, flip flops, software in rewritable memory, configurable hardware states, combinations thereof, etc.). In one example, data storage 320 includes databases, spreadsheets, tables, lists, matrices, trees, or any other type of data structure. Examples of data storage 320 include, without limitation, clock signal 322, low period 324, threshold(s) 326, and address 328.

Figure 4:
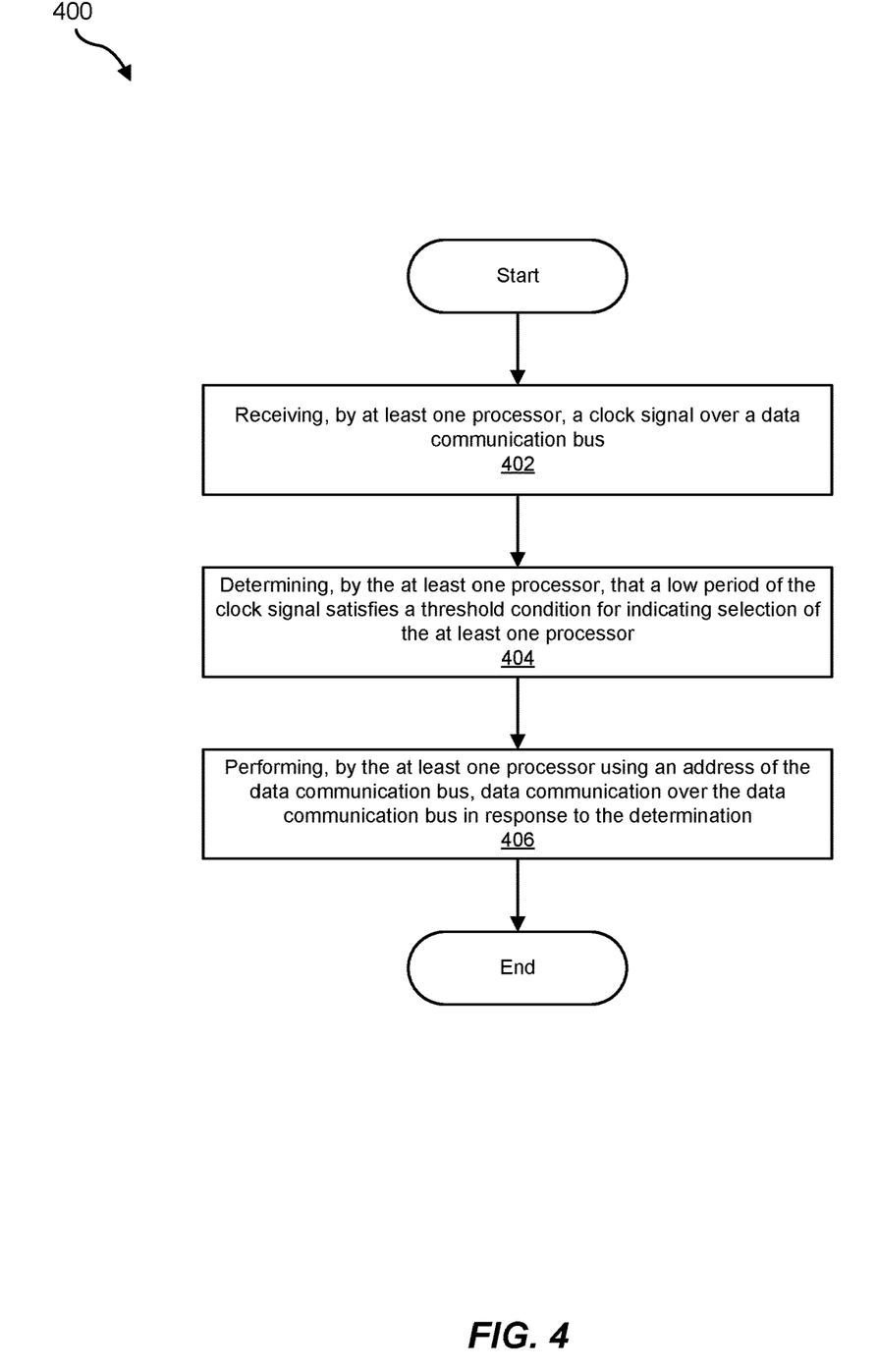
FIG. 4 is a flow diagram of another example method for data communication bus address sharing.

FIG. 4 is a flow diagram of an example computer-implemented method 400 for data communication bus address sharing. As illustrated in FIG. 4, at step 402 one or more of the systems described herein can receive a clock signal. For example, timing module 304 can receive, by at least one processor, a clock signal over a data communication bus.

The systems described herein can perform step 402 in a variety of ways. In one example, timing module 304 can receive the clock signal from a data communication bus controller via a clock pin (e.g., clock signal (CS) pin, serial clock (SCL) pin, etc.) of a peripheral device in which timing module is located. Additionally, timing module 304 can utilize a timer connected to the at least one processor to measure the low period of the clock signal. Example timers can be a literal timer that calculates time, a resistor, a capacitor, a combination of a resistor and a capacitor (e.g., an RC circuit), a delta-sigma circuit, etc.

The term "delta-sigma circuit," as used herein, can generally refer to a circuit that encodes a digital input signal into a signal that is mapped to voltages. For example, and without limitation, a delta-sigma circuit can encode a digital input signal into a lower-resolution but higher sample frequency signal that is mapped to voltages and smoothed with an analog filter. The higher sample frequency signal can facilitate timing measurement with increased accuracy.

At step 404 one or more of the systems described herein can determine satisfaction of a threshold condition. For example, determination module 306 can determine, by the at least one processor, that a low period of the clock signal satisfies a threshold condition for indicating selection of the at least one processor.

The systems described herein can perform step 404 in a variety of ways. In one example, determination module 306 can determine that the low period of the clock signal has a duration that falls below the threshold. In another example, determination module 306 can determine that the low period of the clock signal has a duration that exceeds the threshold. In another example, determination module 306 can determine that the low period of the clock signal has a duration that falls between the threshold and another threshold. In these contexts, a data communication bus controller can be configured to perform modulation of a duty cycle of the clock signal to cause the low period of the clock signal to satisfy the threshold condition. Additionally, the data communication bus controller can be configured to perform the modulation to cause the clock signal to remain within clock period parameters specified by a data communication protocol of the data communication bus. In this context, determination module 306 can further determine that the low period of the clock signal additionally has a duration that remains within the clock period parameters specified by the data communication protocol of the data communication bus and, thus, is a valid selection indication as opposed to a fault condition.

At step 406 one or more of the systems described herein can perform data communication. For example, communication module 308 can perform, by the at least one processor using an address of the data communication bus, data communication over the data communication bus in response to the determination.

The systems described herein can perform step 406 in a variety of ways. In one example, communication module 308 can perform the data communication over the data communication bus with a data communication bus controller. In some implementations, communication module 308 can additionally receive, by the at least one processor, a start signal from the data communication bus via a data pin (e.g., serial data (SDA) pin) of the peripheral device in which the communication module 308 is located. Alternatively, communication module 308 can sense pulling low of a chip select signal line. In these contexts, communication module 308 can further perform the data communication over the data communication bus in response to the satisfaction of the threshold condition and the start signal and/or the pulling low of the chip select signal line.

Figure 5:
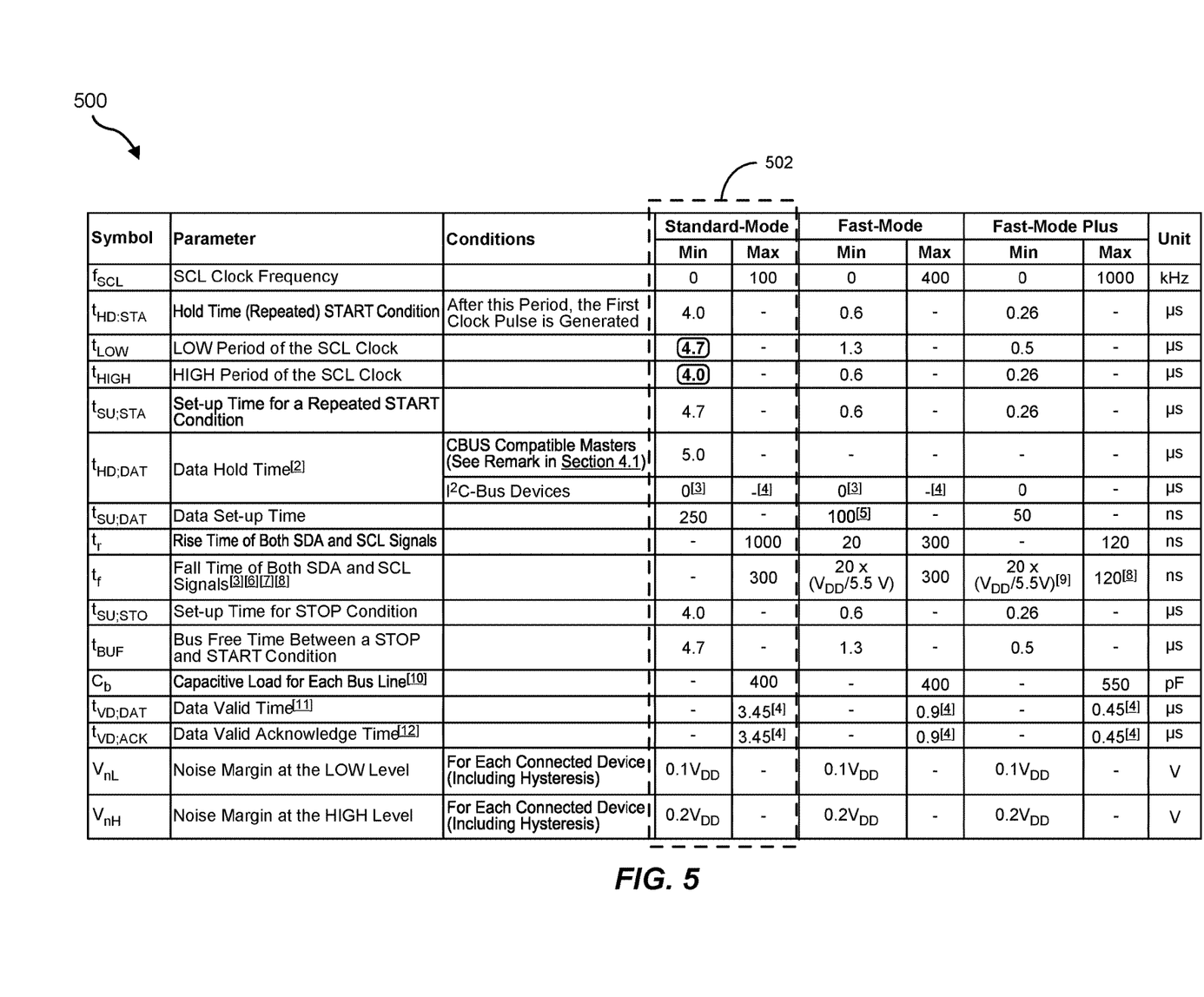
FIG. 5 is a graphical illustration of example data communication bus protocol parameters.

FIG. 5 illustrates example data communication bus protocol parameters 500 (e.g., 3.3V I2C bus electrical characteristics). Taking 100K standard mode 502 as an example, signal duty ratio has a period of ten microseconds and the protocol requests that a low minimal duty cycle is 4.7 and a high minimal duty cycle is 4.0 microsecond, totaling 8.7 microseconds of the ten microseconds available. As a result, the clock signal can be modulated up to 1.3 microseconds while remaining in the requirements of the example protocol. Various data bus communication protocols have different requirements relating to clock signal duty cycle and period. Thus, the range of 1.3 microseconds is purely for illustration.

Figure 6:
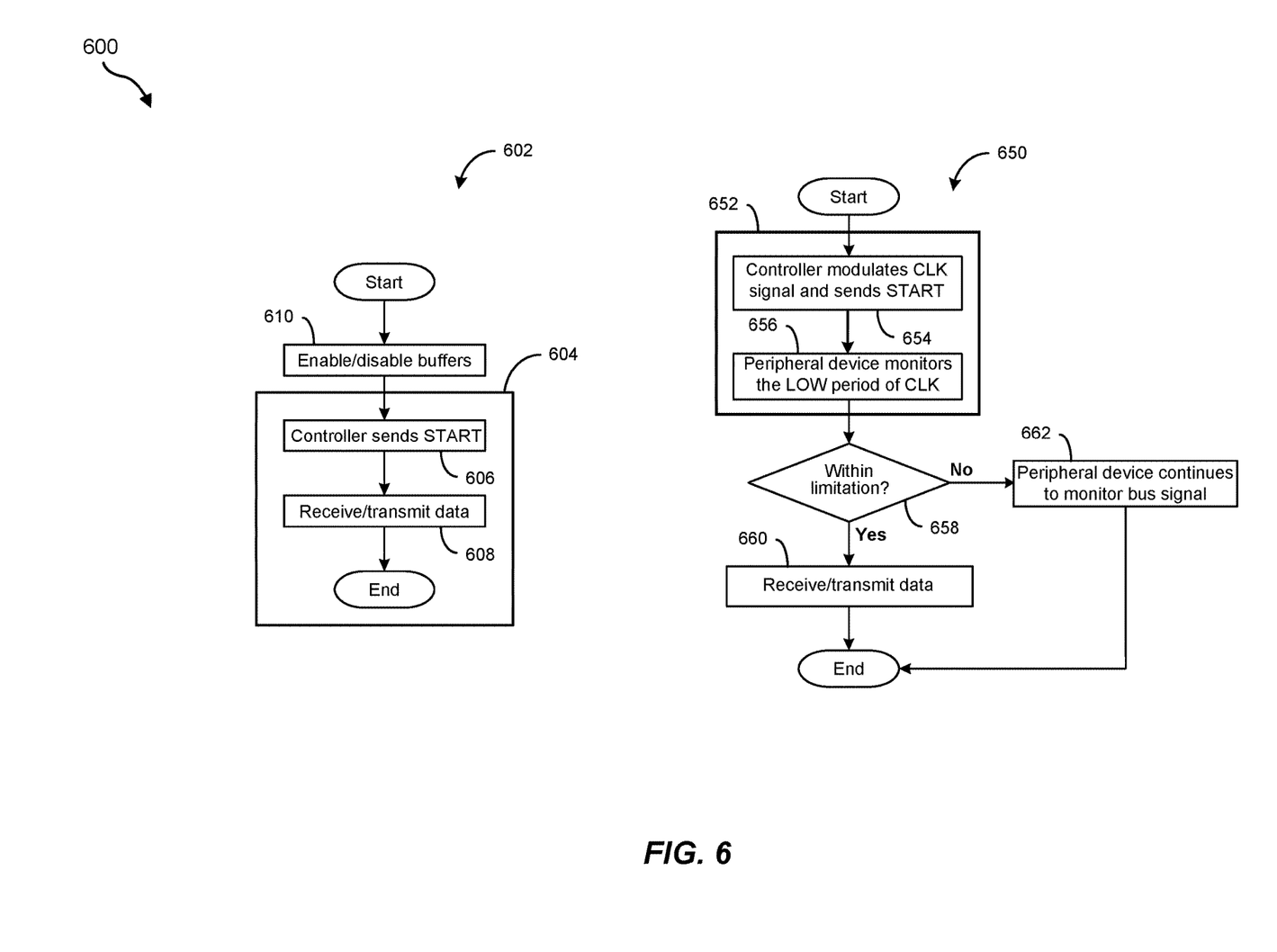
FIG. 6 is a set of flow diagrams illustrating example methods for data communication bus address sharing.

FIG. 6 illustrates example methods 600 for data communication bus address sharing. For example, method 602 corresponds to a simplified I2C bus workflow in which a process 604 depicts normal operation in which a data communication bus controller and a peripheral device perform communication. In process 604, the data communication bus controller can, at step 606, send a start command to the peripheral device over a data communication channel of the bus. At step 608, the data communication bus controller and the peripheral device can send and receive data over the data communication channel of the bus. To avoid address conflict by employing a chip buffer or a discrete part to separate peripheral devices on the same bus address, the data communication bus controller can first enable and disable correct buffers at step 610 to put a targeted device into the bus and push an unwanted device out of the bus.

Method 650 can be utilized with a discharge/timer integrated on a clock wire of the peripheral device. Using this timer, a data communication bus controller and a peripheral device can interact in process 652. The data communication bus controller can change the LOW period of the clock signal and send START to an address of the bus at step 654. Peripheral devices connected to the bus can use their respective timers to monitor the LOW period of the clock signal at step 656. Based on the duration of the clock signal, the peripheral devices sharing the address can, at step 658, detect whether the controller is attempting to communicate with those devices. If the duration of the LOW period of the clock signal satisfies a threshold condition for a peripheral device, that peripheral device can respond to the START signal by receiving and/or transmitting data with the data communication bus controller at step 660. For other peripheral devices for which the LOW period of the clock signal fails to satisfy respective threshold conditions for those peripheral devices, those peripheral devices can ignore the START signal and continue to monitor the bus data signal at step 662.

In an example of the above, adjusting the data bus controller clock signal output duty ratio can permit two peripheral devices to have a same address on one bus. One of the peripheral devices can react when the clock signal LOW period is longer than five microseconds while the other can react when the clock signal LOW period is shorter than five microseconds. In this way, two peripheral devices sharing a same bus address can avoid influencing each other and the data communication bus controller can use them both properly.

The above implementation can be extended to allow more than two devices to share a same bus address. For example, if bus protocol parameters provide sufficient range of clock signal modulation capability and/or if sufficiently precise timers (e.g., delta-sigma circuit) provide accurate timing measurement, three peripheral devices can share a same bus address. A first one of the peripheral devices can be triggered by the START signal if the clock period LOW signal falls above a first threshold. A second one of the peripheral devices can be triggered by the START signal if the clock signal LOW period falls below a second threshold lower than the first threshold. A third one of the peripheral devices can be triggered by the START signal if the clock signal LOW period lies between the first threshold and the second threshold. Yet more peripheral devices can share a same bus address if more thresholds are added and if available bus protocol parameters and timing measurement precision permit.

Figure 7:
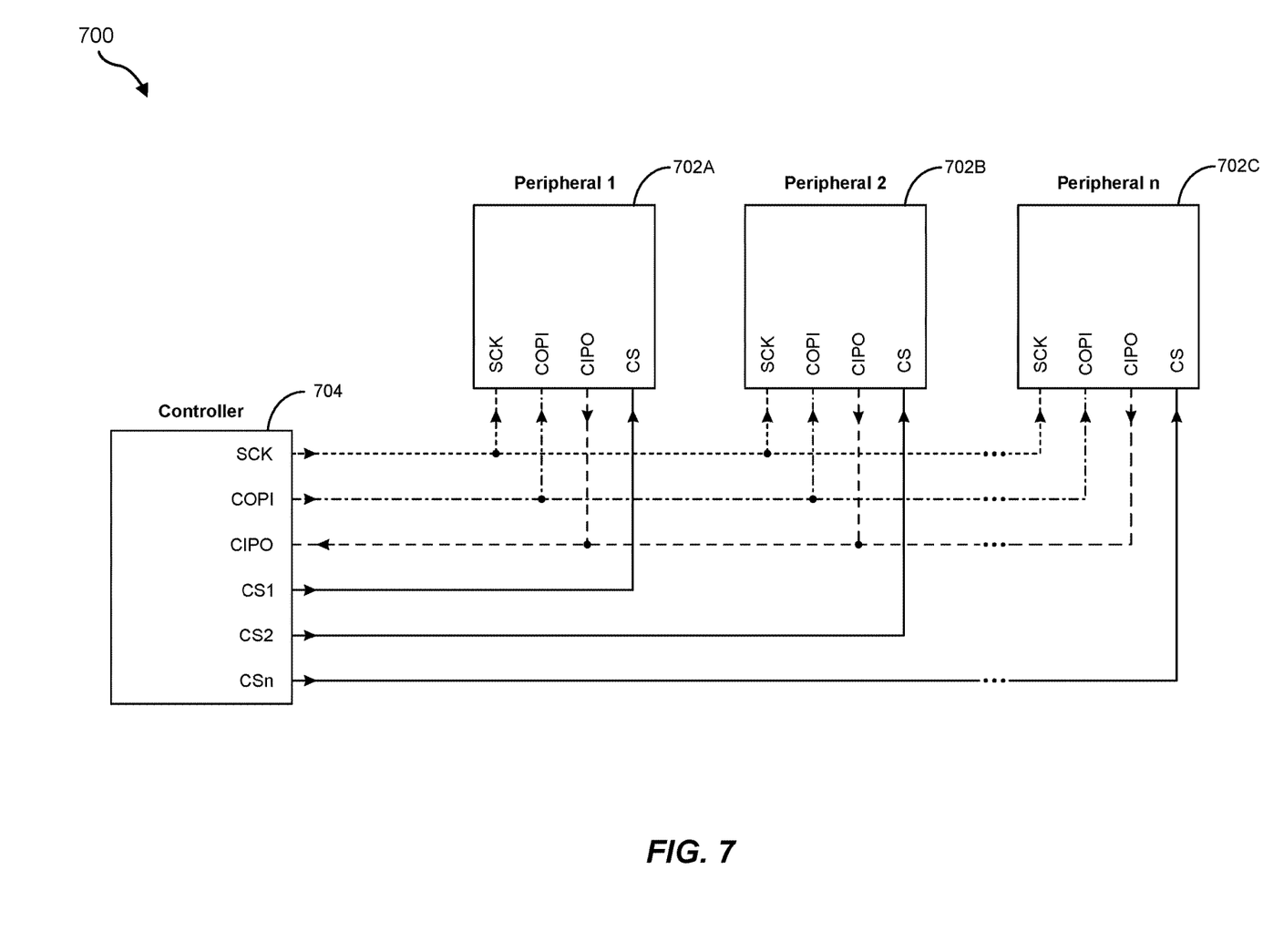
FIG. 7 is a block diagram illustrating an example data communication bus.

FIG. 7 illustrates an example data communication bus 700 using another data communication bus protocol (e.g., serial peripheral interface (SPI)). Normally, in order to use multiple SPI peripheral devices 702A, 702B, and 702C in a bus, a same number of chip select (CS) pins are used to distinguish the peripheral devices 702A, 702B, and 702C from one another. In this case, a peripheral device does not respond unless its CS pin is pulled low by the data communication bus controller 704. This process is similar to the I2C bus, but the I2C bus uses firmware-based addressing whereas SPI implements addressing using a physical CS pin.

Figure 8:
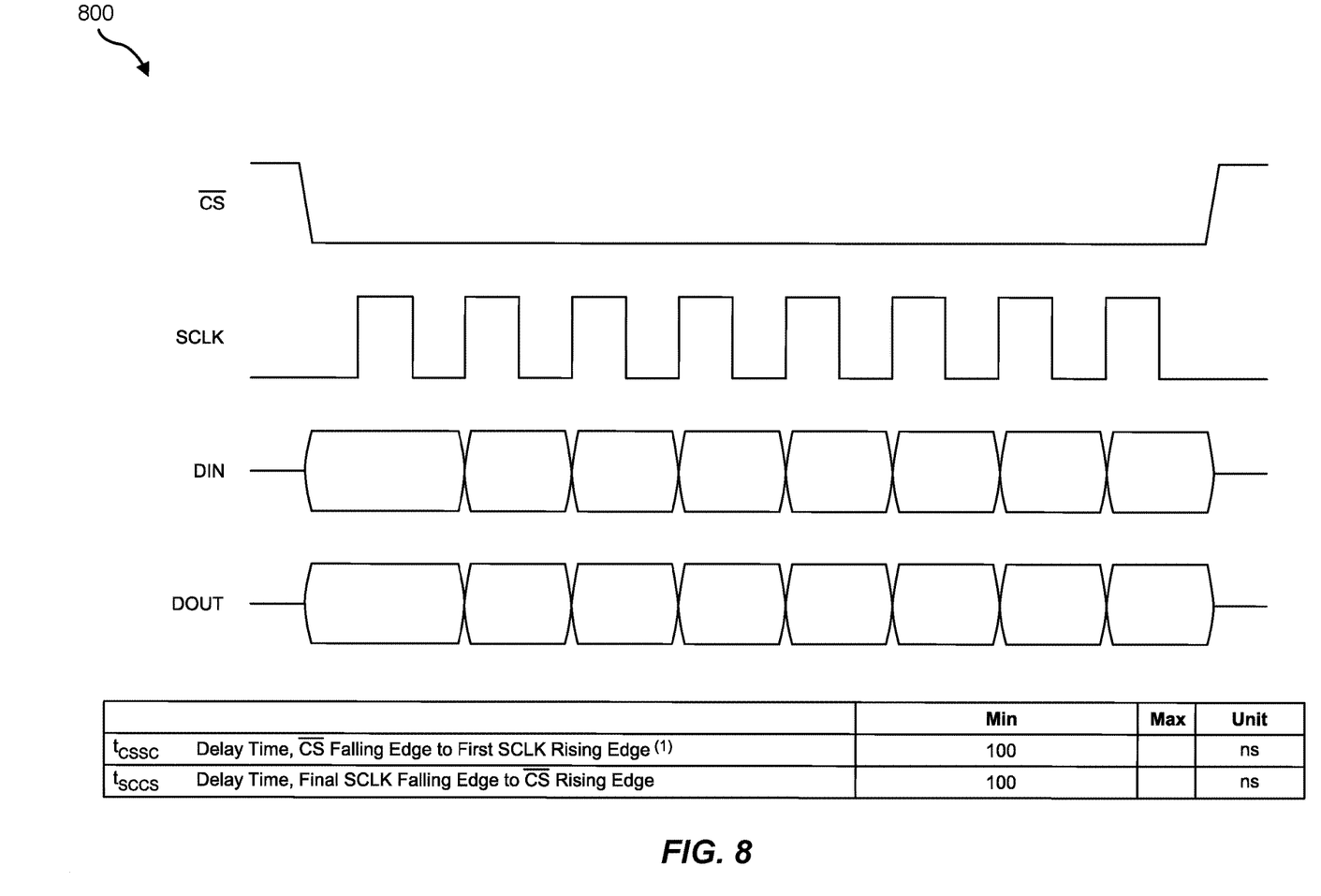
FIG. 8 is a graphical illustration of an example timing diagram depicting specifications and timing relationships according to another example data communication bus protocol.

FIG. 8 illustrates an example timing diagram 800 depicting specifications and timing relationships between SPI digital lines. In SPI, a peripheral device can monitor the CS pin and catch the illustrated waveforms if its CS pin is pulled low. There is no timeout or maximum time between the first CS falling edge to the first CS climbing edge. The delay time $T_{CSSC}$ between the CS signal and clock signal can be used to place two or more peripheral devices on one bus using only one CS pin for both of them, and the peripheral devices can monitor/measure this delay time $T_{CSSC}$ between the CS signal and the clock signal. The peripheral devices can be configured so that one peripheral device responds if the delay time $T_{CSSC}$ is below two-hundred nanoseconds, and another peripheral device can respond if the delay time $T_{CSSC}$ is above two-hundred fifty nanoseconds. Updated firmware can notify the data communication bus controller that it has more than one peripheral device sharing the CS pin with different timing characteristics. Since the duty ratio of the clock signal governs both the timing of the CS signal and the low period of the clock signal, the data communication bus controller can modulate the clock signal duty ratio to adjust the delay time $T_{CSSC}$ in any manner described herein. In this way, the data communication bus master can communicate with any one of the peripheral devices without signal conflict.

Figure 9:
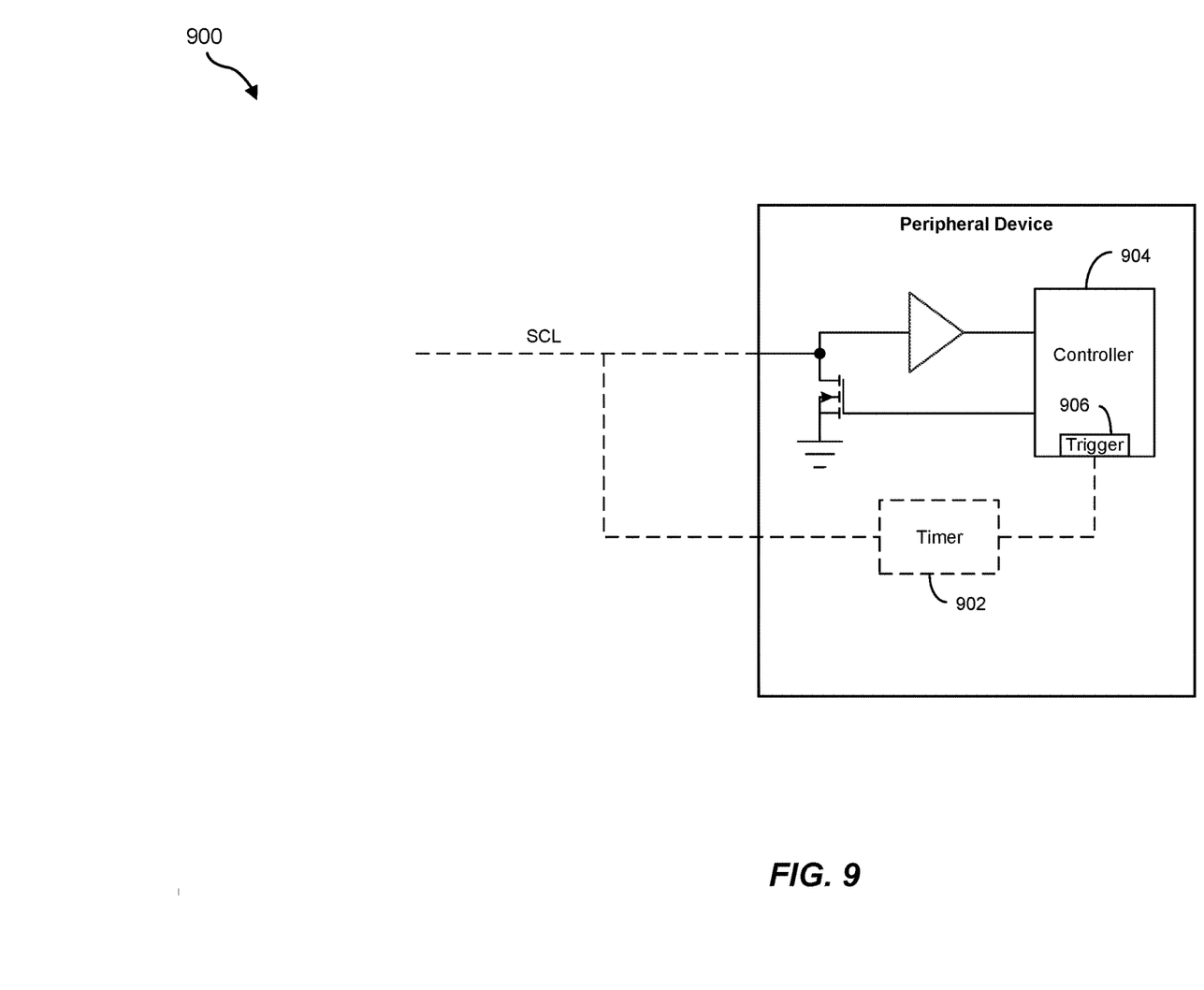
FIG. 9 is a block diagram illustrating an example peripheral device having data communication bus address sharing capability.

FIG. 9 illustrates an example peripheral device 900 having data communication bus address sharing capability. For example, peripheral device 900 can monitor a serial clock (SCL) pin with a timer 902 connected to a controller 904 of the peripheral device 900. By adding a timer 902 at a clock wire of the peripheral device, the peripheral device can monitor the low period of the SCL and determine if a data communication bus controller sent a trigger 906 to enable the peripheral device to exchange data with the data communication bus controller. The timer 902 can be a literal timer that calculates time, a resistor, a capacitor, a combination of a resistor and a capacitor (e.g., an RC circuit), a delta-sigma circuit, etc. A delta-sigma circuit can be controlled more precisely than the other timer options and can be used to enable bus address sharing when protocol parameters are relatively restrictive and/or to allow for additional clock signal duty cycle thresholds to be observed for sharing of a particular bus address by more than two peripheral devices. Firmware of the data communication bus controller can be updated to support adjusting duty ratio of the serial clock SCL while remaining within bus protocol requirements.

As set forth above, the disclosed systems and methods can allow multiple peripheral devices to share a same address (e.g., chip select (CS) pin, a serial data (SDA) line, etc.) of an addressable bus protocol without requiring use of a buffer or an additional bus. For example, a peripheral (i.e., slave) device can be configured with a timer (e.g., a literal timer, a discharge circuit (e.g., capacitor, resistor, resistor capacitor (RC) circuit) or other mechanism (e.g., delta-sigma circuit) on the slave clock wire. In some implementations, the peripheral device can use the timer to measure a duration between a chip select signal and an end of a low period of a clock signal. Alternatively, the peripheral device can use the timer to measure the low period of the clock signal. In these contexts, the data communication bus controller (i.e., master) firmware can be configured to adjust the clock duty cycle to control this duration depending on the particular device (e.g., sharing a same CS pin, sharing a same SDA line, etc.) with which it wishes to communicate. Thus, both the master and peripheral device can observe one or more threshold conditions. For example, one peripheral device sharing a CS pin can respond to the CS pin being pulled low if the duration is below a threshold, and another peripheral device sharing the same CS pin can respond to the CS pin being pulled low if the duration is above the threshold. In another example, one peripheral device sharing an SDA line can respond to the receipt of a start signal if the duration is below a threshold, and another peripheral device sharing the SDA signal line can respond to receipt of the start signal if the duration is above the threshold. Multiple thresholds can be used to allow more than two peripheral devices to share a same address (e.g., CS line, SDA line, etc.). Advantageously, the device address space can be increased at significantly lower cost compared to use of a buffer or an additional bus.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A data communication bus controller, comprising:
    selection circuitry configured to select one of two or more peripheral devices sharing an address of a data communication bus;
    modulation circuitry configured to perform modulation of a duty cycle of a clock signal transmitted over the data communication bus to the two or more peripheral devices, wherein the modulation causes a low period of the clock signal to satisfy a threshold condition for indicating selection of the selected one of the two or more peripheral devices; and
    communication circuitry configured to use the address to perform data communication over the data communication bus with the selected one of the two or more peripheral devices.

2. The data communication bus controller of claim 1, wherein the communication circuitry is further configured to transmit, to the two or more peripheral devices, a start signal.

3. The data communication bus controller of claim 1, wherein the communication circuitry is further configured to pull low a chip select signal line shared by the two or more peripheral devices.

4. The data communication bus controller of claim 1, wherein the modulation causes the low period of the clock signal to fail to satisfy an additional threshold condition for indicating selection of an unselected one of the two or more peripheral devices.

5. The data communication bus controller of claim 1, wherein the modulation causes the clock signal to remain within clock period parameters specified by a data communication protocol of the data communication bus.

6. A system comprising:
a data communication bus;
two or more peripheral devices connected to the data communication bus and configured to share an address of the data communication bus; and
a data communication bus controller connected to the data communication bus and configured to modulate a duty cycle of a clock signal transmitted over the data communication bus to the two or more peripheral devices, wherein the modulation causes a low period of the clock signal to satisfy a threshold condition for indicating selection of a selected one of the two or more peripheral devices.

7. The system of claim 6, wherein the data communication bus controller is further configured to select the selected one of the two or more peripheral devices.

8. The system of claim 6, wherein the data communication bus controller is further configured to use the address to perform data communication over the data communication bus with the selected one of the two or more peripheral devices.

9. The system of claim 6, wherein the selected one of the two or more peripheral devices is configured to perform the data communication over the data communication bus with the data communication bus controller in response to the satisfaction of the threshold condition.

10. The system of claim 6, wherein the data communication bus controller is further configured to at least one of:
transmit a start signal to the two or more peripheral devices; or
pull low a chip select signal line shared by the two or more peripheral devices.

11. The system of claim 10, wherein the selected one of the two or more peripheral devices is configured to perform data communication over the data communication bus with the data communication bus controller in response to the satisfaction of the threshold condition and the at least one of the start signal or the pulling low of the chip select signal line.

12. The system of claim 6, wherein the modulation causes the low period of the clock signal to fail to satisfy an additional threshold condition for indicating selection of an unselected one of the two or more peripheral devices.

13. The system of claim 12, wherein the unselected one of the two or more peripheral devices is configured to avoid performing data communication with the data communication bus controller in response to the failure to satisfy the additional threshold condition.

14. The system of claim 6, wherein the modulation causes the clock signal to remain within clock period parameters specified by a data communication protocol of the data communication bus.

15. The system of claim 6, wherein the two or more peripheral devices are configured to share the address of the data communication bus without requiring use of a buffer and without requiring use of an additional bus.

16. A computer-implemented method comprising:
selecting, by at least one processor, one of two or more peripheral devices sharing an address of a data communication bus;
modulating, by the at least one processor, a duty cycle of a clock signal transmitted over the data communication bus to the two or more peripheral devices, wherein the modulating causes a low period of the clock signal to satisfy a threshold condition for indicating selection of the selected one of the two or more peripheral devices; and
performing, by the at least one processor using the address, data communication over the data communication bus with the selected one of the two or more peripheral devices.

17. The computer-implemented method of claim 16, further comprising transmitting, by the at least one processor and to the two or more peripheral devices, a start signal.

18. The computer-implemented method of claim 16, further comprising pulling low a chip select signal line shared by the two or more peripheral devices.

19. The computer-implemented method of claim 16, wherein the modulating causes the low period of the clock signal to fail to satisfy an additional threshold condition for indicating selection of an unselected one of the two or more peripheral devices.

20. The computer-implemented method of claim 16, wherein the modulation causes the clock signal to remain within clock period parameters specified by a data communication protocol of the data communication bus.

* * * * *